United States Patent Office 3,454,737
Patented July 8, 1969

3,454,737
METHOD AND APPARATUS FOR CONTROLLING THE FLOW OF LIQUID THROUGH SPARK-MACHINING GAPS
Jean Pfau, Geneva, Heinz Rhyner, Meyrin, Geneva, and Georges Semon, Geneva, Switzerland, assignors to Ateliers des Charmilles S.A., Geneva, Switzerland
Filed Feb. 23, 1966, Ser. No. 529,485
Claims priority, application Switzerland, Feb. 25, 1965, 2,574/65
Int. Cl. B23k 9/16; H05b 1/00
U.S. Cl. 219—69                                    11 Claims

ABSTRACT OF THE DISCLOSURE

A method for machining a workpiece through intermittent electric discharges across an operative liquid comprising providing a series of interrupted pulse trains to an electrode, retracting the electrode during interruptions in the pulse trains and controlling the flow of operative liquid to the gap between the workpiece and the electrode such that the operative liquid is forced at increased rate into the gap during interruptions in the pulse trains.

---

In the methods of electric machining according to which intermittent discharges are produced between an electrode and the workpiece to be machined, which is separated from the electrode by an operative liquid, it is a well-known fact that the liquid is subjected to a forced renewal within the space defined between the electrode and the workpiece, so as to prevent any solid residuum and the gasses produced by the machining discharges from fouling the space to a too great extent.

According to one machining method operating through electric discharges, it has already been proposed to speed up the throughput of renewal of the dielectric liquid between the electrode and the workpiece to be machined in response to the short circuits which may appear as a consequence of the residual matter collecting between the electrode and the workpiece within the machining space.

In all known methods of machining through electric discharges, it is a well-known fact that the removal of material is not performed solely on the workpiece to be machined, but also on the electrode, which modifies the shape of the latter and makes it often necessary to replace it during a machining operation.

Electric machining methods operating through intermittent erosive discharges, which are also termed electroding operations, have recently been improved by giving the discharge current pulses a predetermined polarity and a substantial pulse width of several hundred microseconds, and it has become possible to obtain in certain cases for copper and graphite electrodes, a negligible wear of the electrodes of a magnitude of a fraction of one percent of the wear of the workpiece by volume.

Similarly it is known that when forced renewal of the operative liquid, generally a liquid dielectric, such as a mineral oil, is resorted to for a rapid removal of the residual matter formed by the erosive discharges and suspended in the operative liquid, together with the gases formed by the discharges the machining throughput may be increased. The forced renewal allows the passage of a more intense machining current without any formation of short-circuits, welds or hot points between the electrode and workpiece, such as would occur with exaggerated fouling of the operative liquid.

However, when the above-mentioned methods, are combined it is found that the wear of the electrode, although negligible over a portion of the operative surface, is considerable along the portions located in the vicinity of the points at which the fresh operative liquid enters to provide forced renewal within the gap between the electrode and the workpiece and unacceptable electrode wear results even of several ten percents, can appear.

This phenomenon is believed to be ascribable to the fact that a negligible wear of the electrode cannot be obtained when using current pulses of a long duration unless the operative liquid permits in the electrode and work gap, at least a minimum content of fouling material. This explains why the wear of the electrodes decreases gradually for points of the operative surface of the electrode further from the points at which the fresh liquid enters the gap.

The present invention has for its object a machining method which prevents non-uniform wear of the electrode over its operative surface while benefitting by the advantage of an increase in the machining throughputs obtained by a forced renewal of the operative liquid.

The present invention covers a machining method operating through intermittent electric discharges between an electrode and a workpiece to be machined, the discharges being executed across an operative liquid fed into the gap between the workpiece and the electrode. The operative liquid is subjected to a forced renewal within the gap while the throughput of the renewed liquid and the intensity of the machining current may be subjected to modification. According to the present invention, the method comprises causing the periods of maximum renewal of the operative liquid to coincide with the periods during which the machining current is at a minimum while the periods during which the throughput of the renewed liquid is at a minimum coincides with the periods during which the machining current is at a maximum.

The accompanying drawings illustrate diagrammatically and by way of example, a plant for performing the method of the invention. In the drawings.

Figure 1:
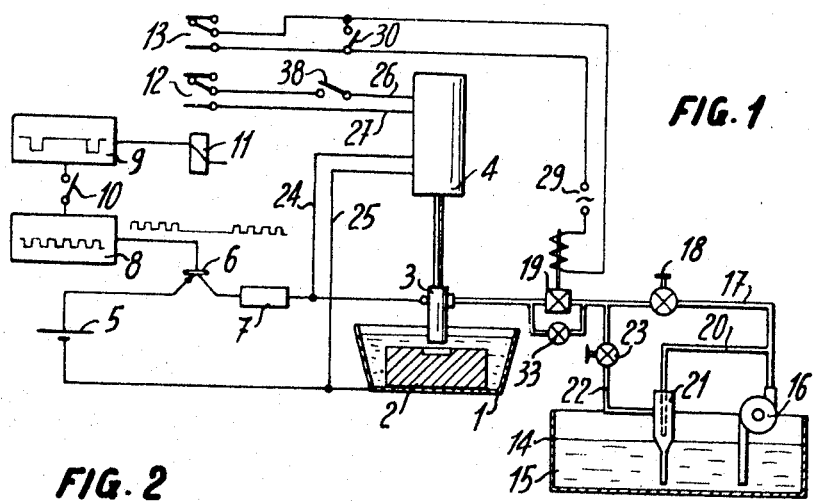
FIG. 1 is a general view of the plant.

The plant illustrated in FIG. 1 includes a vat 1 inside which is laid a workpiece 2 to be machined. The machining is executed by means of an electrode 3 carried by a servomechanism 4.

The intermittent machining discharges are produced by a supply 5 of direct current which is connected with the workpiece 2 and with the electrode 3 through circuit-breaking means 6, which is illustrated as a power transistor, and through a resistor 7 limiting the maximum value of the current.

The circuit-breaking means 6 are controlled by a generator 8 controlled in turn by a further generator 9. The generator 8 supplies uniform pulses at a comparatively high frequency whereas the generator 9 supplies pulses of a lower frequency which are applied to the generator 8 so as to lock the latter. Thus, the generator 8 supplies the circuit-breaking means 6 with trains each constituted by a succession of pulses separated by time intervals during which no pulse is produced. A switch 10 is provided to prevent control of the generator 8 by the generator 9 when desired.

The output signal produced by the generator 9 is applied to the winding of a relay 11 provided with two operative contact-pieces 12 and 13 the operation of which will be disclosed hereinafter.

The plant further includes a container 14 for an operative liquid 15 generally constituted by a dielectric adapted to be sucked out by a pump 16. The output end of pump 16 is connected through a pipe 17, provided with a manually-operated valve 18 and also with an electromagnetically controlled valve 19, with the electrode 3 so as to feed the latter with the dielectric liquid through one or more passages formed in the body of the electrode and leading into the machining gap extending between the electrode and the workpiece 2.

Ahead of the valve 18, the pipe 17 is connected through a shunt pipe 20 with a water blast 21 having a suction end connected through a pipe 22 and a manually-operated valve 23 to the portion of the pipe 17 extending between the valve 18 and the electromagnetically controlled valve 19.

The electrode-carrying servo-mechanism 4 is sensitive to the signal constituted by the voltage prevailing between the workpiece 2 and the electrode 3, and is adapted to maintain the distance separating the electrode from the workpiece substantially constant throughout the duration of each train of intermittent discharges. The servo-mechanism is of a type known per se and does not form part of the invention, so that it is not necessary to describe it with any further detail. The control signal for servo-mechanism 4 is tapped off directly across the leads 24 and 25 as disclosed hereinafter.

The servo-mechanism 4 includes means for controlling the receding movement of the electrode. That is, when leads 26 and 27 are connected together electrode 3 is moved away from the workpiece 2. Leads 26 and 27 are connected with the contact-piece 12, controlled by the relay 11, through the agency of a switch 38.

The opening of the electromagnetic valve 19 is produced by sending an energizing current into a control winding 28 which is connected with a supply of current 29 through the agency of the contact-piece 13 controlled by the relay 11, the contact-piece being possibly short-circuited by a switch 30.

The electromagnetic valve 19 is shunted by a by-pass 33 which allows the passage of a predetermined throughput of operative liquid when the valve 19 is closed and permits adjustment of the throughput as desired.

The plant described is capable of performing the method according to the invention in various manners. One manner comprises closing the valve 23 and opening the valve 18 so that the dielectric liquid 15 contained inside the container 14 may be delivered under pressure towards the electrode 3 when the valve 19 is open. Valve 19 is opened in response to each pulse supplied by the generator 9, which closes simultaneously the contact-pieces forming the switches 12 and 13 controlled by the relay 11. The switch 10 being closed, the same pulses of the generator 9 produce periodically a locking of the generator 8.

Thus, each pulse supplied by the generator 9 produces, in addition to stopping the train of pulses from the generator 8, a receding movement of the electrode 3 under the control of the servo-mechanism 4 through the closing of the switch 12 by the relay 11, and a pulse-controlled injection of the dielectric liquid is provided by the opening of the valve 19 caused by the closing of the switch 13 under the control of relay 11. When the pulse produced by the generator 9 is at an end, the generator 8 supplies a further train of pulses releasing a succession of operations of the circuit-breaking means 6, which produces a succession of discharges between the electrode 3 and the workpiece 2. The switches 12 and 13 controlled by the relay 11 are now open so that the servo-mechanism 4 returns the electrode 3 into its operative position while the electromagnetically controlled valve 19 closes to stop the feed of dielectric liquid towards the electrode. Thus, it can be seen that the dielectric is renewed during the time intervals separating the trains of machining discharges.

According to modified manners of operating the plant, the opening of the switch 38 prevents the receding movement of the electrode, which movement is not essential for obtaining the object sought by the invention. Consequently, the electrode remains substantially in the same position during the discharge trains and during the intervals separating such trains. However, it should also be remarked that the receding movement of the electrode furthers the renewal of the dielectric.

It is also possible to close the switch 38 and to open the switch 10. The generator 8 then supplies a succession of pulses without any interruption, which pulses are applied to the circuit-breaking means 6. Now, by reason of the periodical receding movement of the electrode 3, the intermittent discharges between the electrode 3 and the workpiece 2 are cut off during each receding movement, so that the machining is actually obtained through successive trains of intermittent discharges.

Closure of switch 30 permits the machining gap to be thoroughly rinsed if desired.

According to another modification of the operation, the dielectric liquid is not fed through the electrode 3 into the machining gap, but is sucked out of the gap through perforations provided in the electrode. In this case, the vat 1 is filled with fresh dielectric liquid, the valve 18 is closed, while the valve 23 is open. Thus, at each opening of the electrically controlled valve 19, the suction of the water blast 21 produces a suction of the dielectric liquid across the electrode 3, which ensures a renewal of the dielectric liquid inside the machining gap.

Obviously, it is possible to provide other modifications and in particular the dielectric liquid may be fed to the machining gap or sucked through it by means of channels in the work to be machined rather than in the electrode. It is also possible to provide for the renewal of the dielectric liquid through the agency of nozzles surrounding the working gap.

It is not necessary to interrupt completely the flow of operative liquid during the machining periods, and the by-pass 33 allows adjusting a minimum throughput which is retained during the working periods. This arrangement permits the maintenance of an average throughput of the operative liquid which is higher than when the throughput is completely cut off during the machining periods. However, it is necessary to maintain the minimum throughput at a value such that it does not result in any substantial wear of the electrode in proximity with the points at which the fresh operative liquid enters the machining gap. Experience has shown that when maintaining the throughput underneath the value for which the machining liquid flows at a speed of a magnitude of 10 cm. per sec. in the vicinity of the points at which the liquid enters the machining gap, the wear of the electrode is hardly discernible in most cases encountered in practice.

Similarly, it is also not essential for the operative current to be chopped into working periods separated by periods of complete stoppage of the machining. It is also possible to provide for a periodical variation of the average machining current between a maximum and a minimum value, the forced renewal of the operative liquid being executed during the periods corresponding to a minimum value of the operative current, while it is cut off or at least substantially reduced during the periods of machining under maximum current conditions.

Figure 2:
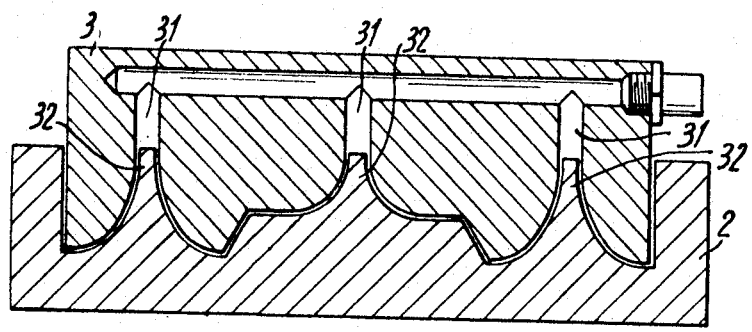
FIGS. 2 and 3 are cross-sections through an electrode and the corresponding workpiece to be machined according to prior practice and to the present invention respectively.
Figure 3:
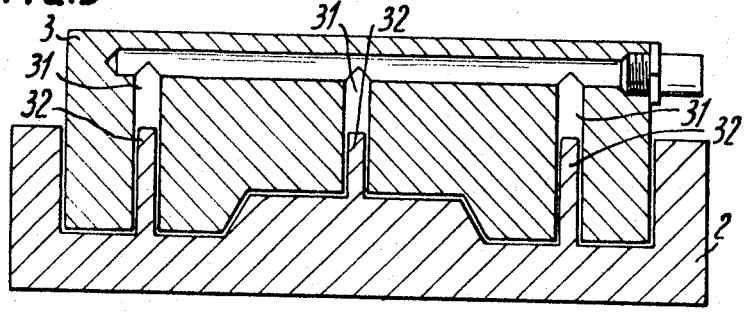

FIGS. 2 and 3 illustrate an electrode 3 during the machining of a workpiece 2. Electrode 3 is provided with recesses 31 through which the dielectric liquid is fed into the machining gap. The case illustrated in FIG. 2 is that of an electrode forming part of a plant wherein the dielectric is renewed during the actual machining, whereas FIG. 3 illustrates the shape of the electrode in accordance with the method forming the object of the invention. It is apparent in the case of FIG. 2 that the electrode has been subjected during the machining to a high wear at the points where the recesses 31 open into its operative surface, whereas in the case of FIG. 3, the wear of the electrode is substantially equal to zero (less than 0.5% by volume) throughout its operative surface.

The surfaces hollowed out of the workpiece 2 in the case of FIG. 3 remain practically flat down to the end of the portions 32 of the piece of work, which enter inside the recesses 31 in the electrode; whereas in the case of conventional machining methods the flat surfaces to be hollowed out of the workpiece 2 were deformed considerably during their progression towards portions 32.

We claim:

1. In a method for machining a workpiece by electric discharges across a dielectric liquid in a space between an electrode and the workpiece, the steps comprising
providing a machining current across said space;
varying the intensity of said machining current; and
controlling the flow of said dielectric liquid to said space by means other than gap dimension such that the flow of said dielectric liquid is increased when the intensity of said machining current is decreased and the flow of said dielectric liquid is decreased when the intensity of said machining current is increased.

2. The invention as recited in claim 1 wherein said step of varying the intensity of said machining current includes completely stopping machining current; and said step of controlling the flow of said dielectric liquid includes permitting maximum flow when said machining current is completely stopped.

3. The invention as recited in claim 2 wherein said step of controlling the flow of said dielectric liquid includes permitting minimum flow when said machining current is present.

4. The invention as recited in claim 2 wherein said step of controlling the flow of said dielectric liquid includes completely stopping said flow when said machining current is present.

5. The invention as recited in claim 1 wherein said step of controlling the flow of said dielectric liquid includes maintaining the flow of said dielectric liquid in said space at a speed of less than 10 cm. per second.

6. The invention as recited in claim 1 wherein said step of varying the intensity of said machining current includes providing successive discharge trains separated by periods during which machining current is interrupted.

7. The invention as recited in claim 1 wherein said step of varying the intensity of said machining current includes moving said electrode away from said workpiece; and said step of controlling the flow of said dielectric liquid includes increasing the flow when said electrode is moved away from said workpiece.

8. Apparatus for machining a workpiece through electric discharges comprising
an electrode spaced from the workpiece to form a gap therebetween;
means for supplying a flow of dielectric liquid to said gap;
means for supplying machining current to said electrode to provide electric discharges across said dielectric liquid in said gap;
means for varying the intensity of said machining current; and
means not fully dependent upon gap dimension for controlling the flow of dielectric liquid so that the flow of dielectric liquid is increased when the intensity of said machining current is decreased and the flow of dielectric liquid is decreased when the intensity of said machining current is increased.

9. The invention as recited in claim 8 wherein said means for controlling the flow of dielectric liquid includes a pulse generator and a valve controlled by the pulses from said pulse generator to increase the flow of dielectric liquid to said gap; and said means for varying the intensity of said machining current includes means responsive to the pulses from said pulse generator to prevent electric discharges across said gap.

10. The invention as recited in claim 9 wherein said means responsive to the pulses from said pulse generator includes a second pulse generator for supplying electrical discharges across said gap except when pulses are received from the first-mentioned pulse generator.

11. The invention as recited in claim 9 wherein means are provided for moving said electrode away from said workpiece in response to pulses from said pulse generator.

References Cited

UNITED STATES PATENTS

| | | |
|---|---|---|
| 3,056,065 | 9/1962 | Porterfield. |
| 3,144,542 | 8/1964 | Haas et al. |

JOSEPH V. TRUHE, *Primary Examiner.*

R. F. STAUBLY, *Assistant Examiner.*